United States Patent
Lu et al.

(10) Patent No.: US 9,665,730 B2
(45) Date of Patent: May 30, 2017

(54) METHOD FOR PROTECTING JAVA PROGRAM

(71) Applicant: FEITIAN TECHNOLOGIES CO., LTD., Beijing (CN)

(72) Inventors: Zhou Lu, Beijing (CN); Huazhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 403 days.

(21) Appl. No.: 14/374,602

(22) PCT Filed: Mar. 18, 2014

(86) PCT No.: PCT/CN2014/073559
§ 371 (c)(1),
(2) Date: Jul. 25, 2014

(87) PCT Pub. No.: WO2014/176950
PCT Pub. Date: Nov. 6, 2014

(65) Prior Publication Data
US 2016/0275298 A1 Sep. 22, 2016

(30) Foreign Application Priority Data
May 3, 2013 (CN) .......................... 2013 1 0159747

(51) Int. Cl.
*G06F 9/44* (2006.01)
*G06F 12/14* (2006.01)
(Continued)

(52) U.S. Cl.
CPC ............ *G06F 21/6209* (2013.01); *G06F 8/31* (2013.01); *G06F 9/45516* (2013.01);
(Continued)

(58) Field of Classification Search
None
See application file for complete search history.

(56) References Cited

U.S. PATENT DOCUMENTS

2004/0039926 A1\* 2/2004 Lambert ............... G06F 21/125
713/189
2004/0098613 A1\* 5/2004 Schiavoni ............. G06F 21/123
726/22
(Continued)

FOREIGN PATENT DOCUMENTS

CN 101261664 A 9/2008
CN 102043932 A 5/2011
(Continued)

OTHER PUBLICATIONS

Wheeler et al., "Java Security Extensions for a Java Server in a Hostile Environment," acsac.org, 2001.\*
(Continued)

*Primary Examiner* — Insun Kang
(74) *Attorney, Agent, or Firm* — Harness, Dickey & Pierce, P.L.C.

(57) ABSTRACT

A method for protecting java program is provided, which relates the field of software protection. The method includes: java virtual machine loading class file; transplanting java instruction corresponding java class method into preset buffer when java instruction corresponding to java class method in class file meets preset condition of portable instruction; obtaining the deepest stack level and the maximum number of local variable of java class method, java class method for obtaining stack and local variable, java method executing the virtual machine in encryption lock and java class method for modifying stack and local variable are filled into position of the transplanted java instruction in class file. By the technical solution, a part of java instructions are transplanted into the encryption lock, the java
(Continued)

programs protected are modified, the logic of which is incomplete, and the original code cannot be restored, the security of the which are improved.

12 Claims, 2 Drawing Sheets

(51) Int. Cl.
    *G06F 9/45*         (2006.01)
    *G06F 21/62*       (2013.01)
    *G06F 21/14*       (2013.01)
    *G06F 9/455*      (2006.01)
    *G06F 21/52*       (2013.01)
    *G06F 21/53*       (2013.01)

(52) U.S. Cl.
    CPC .............. *G06F 21/14* (2013.01); *G06F 21/52* (2013.01); *G06F 21/53* (2013.01); *G06F 2221/033* (2013.01)

(56) References Cited

U.S. PATENT DOCUMENTS

| | | | | |
|---|---|---|---|---|
| 2006/0026430 | A1* | 2/2006 | Luo | G06F 21/16 713/176 |
| 2008/0028474 | A1* | 1/2008 | Horne | G06F 21/16 726/27 |
| 2009/0328004 | A1 | 12/2009 | Balasubramanian | |
| 2010/0313188 | A1* | 12/2010 | Asipov | G06F 21/125 717/139 |
| 2012/0005758 | A1* | 1/2012 | Gnahm | G06F 9/443 726/26 |
| 2012/0174082 | A1* | 7/2012 | Dolby | G06F 8/72 717/151 |
| 2012/0272239 | A1* | 10/2012 | Kalle | G06F 9/544 718/1 |
| 2014/0095812 | A1* | 4/2014 | McLachan | G06F 12/023 711/154 |
| 2014/0173761 | A1* | 6/2014 | Hong | G06F 21/10 726/30 |
| 2014/0195824 | A1* | 7/2014 | Lu | G06F 21/50 713/190 |
| 2016/0170777 | A1* | 6/2016 | Holt | G06F 9/44521 717/166 |

FOREIGN PATENT DOCUMENTS

| | | |
|---|---|---|
| CN | 102214281 A | 10/2011 |
| CN | 102708322 A | 10/2012 |
| CN | 103218551 A | 7/2013 |
| WO | WO-2006063876 A1 | 6/2006 |

OTHER PUBLICATIONS

JavaWorld, "Java Tip 22: Protect your bytecodes from reverse engineering/decompilation," Jan. 1, 1997.*
International Search Report (in English) regarding Application No. PCT/CN2014/073559, mailed Jun. 27, 2014.
International Search Report (in Mandarin) regarding Application No. PCT/CN2014/073559, mailed Jun. 27, 2014.

* cited by examiner

METHOD FOR PROTECTING JAVA PROGRAM

CROSS REFERENCES OF RELATED APPLICATIONS

This application is a 371 U.S. National Phase of PCT/CN2014/073559, filed on Mar. 18, 2014, which claims the priority to Chinese Patent Application No. 201310159747.7, entitled "A METHOD FOR PROTECTING JAVA PROGRAM", filed on May 3, 2013 with State Intellectual Property Office of People's Republic of China, both of which are incorporated herein by reference in their entirety.

FIELD

The present disclosure relates to the software protection field, and particularly, to a method for protecting a JAVA program.

BACKGROUND

JAVA programming language is an interpreted language. A JAVA instruction file is generated by compiling JAVA source codes, and the JAVA instruction file generated is interpreted and executed in a JAVA virtual machine (JVM). The operation mechanism of interpreting and executing makes the JAVA source code easily decompiled. At present, there are many decompilation tools with the effects of which are very efficient, and the decompilation tools makes any JAVA software user more easily decompiles and reconstructs the source code of products. As a result, any authorization certificate license based on the JAVA programming language becomes meaningless.

Therefore, in the software protection field based on the JAVA programming language, an important problem that needs to be resolved is to ensure that the JAVA software program cannot be decompiled and reconstructed or to increase difficulty of decompiling and reconstructing.

SUMMARY

The present disclosure is to overcome disadvantages of the conventional technology by providing a method for protecting a JAVA program.

The technical solution adopted by the present disclosure is a method for protecting a JAVA program, which includes:

step A, loading, by a JAVA virtual machine, a class file, and determining whether the class file is a legal file, executing step B if the class file is the legal file; replying error information and ending if the class file is not the legal file;

step B, obtaining, by the JAVA virtual machine, a total number of JAVA class methods and an initial position of the JAVA class methods in the class file, and finding a current JAVA class method in accordance with the initial position;

step C, parsing, by the JAVA virtual machine, a JAVA instruction corresponding to the current JAVA class method, and determining whether the JAVA instruction is successfully parsed; executing step D if the JAVA instruction is successfully parsed; replying error information and ending if the JAVA instruction is not successfully parsed;

step D, determining, by the JAVA virtual machine, whether the JAVA instruction corresponding to the current JAVA class method meets a preset condition of a portable instruction, transplanting and storing the JAVA instruction corresponding to the current JAVA class method into a preset buffer and executing step E if the JAVA instruction meets the preset condition of the portable instruction; executing step G if the JAVA instruction does not meet the preset condition of the portable instruction;

step E, obtaining, by the JAVA virtual machine, the deepest stack level of the JAVA virtual machine and the maximum number of local variables of the current JAVA class method;

step F, in accordance with the deepest stack level of the JAVA virtual machine and the maximum number of the local variables, filling, by the JAVA virtual machine, a position of the transplanted JAVA instruction in the class file with a JAVA class method for obtaining a stack and a local variable, a JAVA class method for executing a virtual machine in an encryption lock and a JAVA class method for modifying a stack and a local variable, and executing step G;

step G, determining, by the JAVA virtual machine, whether the number of JAVA class methods which have been parsed reaches a total number of the JAVA class methods in the class file, transplanting a JAVA instruction corresponding to a current JAVA class method in the preset buffer into an encryption lock and ending if the number of the JAVA class methods which have been parsed reaches the total number of the JAVA class methods in the class file; continuing to obtain a next JAVA class method and making the next JAVA class method as the current JAVA class method, and returning to execute step C if the number of the JAVA class methods which have been parsed does not reach the total number of the JAVA class methods in the class file.

In step A, the step of determining whether the class file is a legal file comprises: obtaining the class file and determining whether a file header of the class file is a preset string, the class file is the legal file if the file header of the class file is the preset string; the class file is an illegal file if the file header of the class file is not the preset string.

In step C, the step of parsing a JAVA instruction corresponding to the current JAVA class method includes:

step C-1, obtaining, by the JAVA virtual machine, the number of constant pools and an initial position of the constant pools in the class file;

step C-2, obtaining, by the JAVA virtual machine, in accordance with a first member variable and a second member variable of the current JAVA class method, a name of a JAVA class method and a descriptor of the JAVA class method from the constant pools, and determining whether the name of the JAVA class method and the descriptor of the JAVA class method are successfully obtained, executing step C-3 if the name of the JAVA class method and the descriptor of the JAVA class method are successfully obtained; replying error information and ending if the name of the JAVA class method and the descriptor of the JAVA class method are not successfully obtained;

step C-3, obtaining, by the JAVA virtual machine, in accordance with a third member variable and a fourth member variable of the current JAVA class method, an additive attribute of the current JAVA class method, and determining whether the additive attribute is successfully obtained, executing step D if the additive attribute is successfully obtained; replying error information and ending if the additive attribute is not successfully obtained.

The first member variable of the current JAVA class method is an index of a name of a JAVA class method in the constant pools; the second member variable of the current JAVA class method is an index of a descriptor of the JAVA class method in the constant pools; the third member variable of the current JAVA class method is the number of additive attributes of the current JAVA class method; the fourth member variable of the current JAVA class method is an initial position of the additive attributes of the current JAVA class method.

The additive attributes include a code attribute, the code attribute comprises a JAVA instruction of the current JAVA class method and a length of the JAVA instruction of the current JAVA class method.

Between step C and step D, the method includes:

step A-1, displaying, by the JAVA virtual machine, the current JAVA class method of the class file and the JAVA instruction corresponding to the current JAVA class method;

step B-1, determining, by the JAVA virtual machine, whether the number of JAVA class methods which have been parsed is more than a total number of the JAVA class methods in the class file, executing step C-1 if the number of JAVA class methods which have been parsed is more than the total number of the JAVA class methods in the class file; making a next JAVA class method as the current JAVA class method and returning to execute step C if the number of JAVA class methods which have been parsed is not more than the total number of the JAVA class methods in the class file;

step C-1, receiving, by the JAVA virtual machine, a choice of a user for the displayed JAVA class method and the JAVA instruction corresponding to the JAVA class method, and obtaining the initial position of the JAVA instruction corresponding to the JAVA class method which has been chosen by the user according to the additive attribute, and finding the JAVA instruction corresponding to the current JAVA class method according to the initial position, and executing step D.

Step D Includes:

step A-2, determining, by the JAVA virtual machine, whether the JAVA instruction corresponding to the current JAVA class method meets a preset condition of a portable instruction, executing step B-2 if the JAVA instruction corresponding to the current JAVA class method meets the preset condition of the portable instruction; executing step G if the JAVA instruction corresponding to the current JAVA class method does not meet the preset condition of the portable instruction;

step B-2, displaying, by the JAVA virtual machine, the current JAVA class method of the JAVA file and the JAVA instruction corresponding to the current JAVA class method;

step C-2, determining, by the JAVA virtual machine, whether the number of JAVA class methods which have been parsed is more than a total number of the JAVA class methods in class files, executing step D-2 if the number of the JAVA class methods which have been parsed is more than the total number of the JAVA class methods in class files; making a next JAVA class method as the current JAVA class method and returning to execute step C if the number of the JAVA class methods which have been parsed is not more than the total number of the JAVA class methods in class files;

step D-2, receiving, by the JAVA virtual machine, a choice of a user for the displayed JAVA class method and JAVA instruction corresponding to the JAVA class method, and according to the additive attribute, obtaining an initial position of a JAVA instruction which has been chosen, and making a JAVA instruction in the initial position as a current JAVA instruction, and transplanting and storing the current JAVA instruction into a preset buffer, and executing step E.

Determining whether the JAVA instruction corresponding to the current JAVA class method meets a preset condition of a portable instruction includes:

step D-1, determining, by the JAVA virtual machine, whether a type of the JAVA instruction corresponding to the current JAVA class method is in a preset collection of types of a portable JAVA instruction, executing step D-2 if the type of the JAVA instruction corresponding to the current JAVA class method is in the preset collection of the type of a portable JAVA instruction; executing step G if the type of the JAVA instruction corresponding to the current JAVA class method is not in the preset collection of the type of a portable JAVA instruction, which indicates that the current instruction cannot be transplanted;

step D-2, determining, by the JAVA virtual machine, whether the JAVA instruction corresponding to the current JAVA class method is in a preset instruction collection of a reference constant pool, executing step G if the JAVA instruction corresponding to the current JAVA class method is in the preset instruction collection of the reference constant pool, which indicates that the current instruction cannot be transplanted; executing step D-3 if the JAVA instruction corresponding to the current JAVA class method is not in the preset instruction collection of the reference constant pool;

step D-3, determining, by the JAVA virtual machine, whether the JAVA instruction corresponding to the current JAVA class method relates to a memory operation, executing step G if the JAVA instruction corresponding to the current JAVA class method relates to the memory operation, which indicates that the current instruction cannot be transplanted; executing step D-4 if the JAVA instruction corresponding to the current JAVA class method does not relate to the memory operation;

step D-4, determining, by the JAVA virtual machine, whether the JAVA instruction corresponding to the current JAVA class method operates a member variable of the class file structure, executing step G if the JAVA instruction corresponding to the current JAVA class method operates the member variable of the class file structure, which indicates that the current instruction cannot be transplanted; executing step D-5 if the JAVA instruction corresponding to the current JAVA class method does not operate the member variable of the class file structure;

step D-5, determining, by the JAVA virtual machine, whether the JAVA instruction corresponding to the current JAVA class method invokes an external JAVA class method, executing step G if the JAVA instruction corresponding to the current JAVA class method invokes the external JAVA class method, which indicates that the current instruction cannot be transplanted; executing step E if the JAVA instruction corresponding to the current JAVA class method does not invoke the external JAVA class method.

The preset collection of types of the portable JAVA instruction includes a stack operation instruction type, a logical operation instruction type, a bitwise operation instruction type, and an arithmetic operation instruction type.

In step F, filling the position of the transplanted JAVA instruction in the class file with the JAVA class method for obtaining the stack and the local variable includes:

step F-11, locating, by the JAVA virtual machine, a position of a transplanted current JAVA class method;

step F-12, creating, by the JAVA virtual machine, a index of a constant pool of the current JAVA class method;

step F-13, filling, by the JAVA virtual machine, the position of the transplanted current JAVA class method with the index of the constant pool and the JAVA class method for obtaining stacks and local variables.

In step F, filling, by the JAVA virtual machine, the position of the transplanted JAVA instruction in the class file with the JAVA class method for executing the virtual machine in the encryption lock includes:

step F-21, locating, by the JAVA virtual machine, a position of a transplanted current JAVA class method;

step F-22, creating, by the JAVA virtual machine, a constant pool index of the current JAVA class method;

step F-23, filling, by the JAVA virtual machine, the position of the transplanted current JAVA class method with the index of the constant pool and the JAVA class method for executing the virtual machine in the encryption lock.

In step F, filling the position of the transplanted JAVA instruction in the class file with the JAVA class method for modifying stacks and local variables includes:

step F-31, locating, by the JAVA virtual machine, a position of a transplanted current JAVA class method;

step F-32, creating, by the JAVA virtual machine, a constant pool index of the current JAVA class method;

step F-33, filling, by the JAVA virtual machine, the position of the transplanted current JAVA class method in the class file with the index of the constant pool and the JAVA class method for modifying the stacks and the local variables.

The advantage of the present disclosure is that a few of JAVA instructions are transplanted into an encryption lock, the JAVA programs protected are modified, thus the logic of the program is incomplete, and the original software code cannot be restored, thus the security of the JAVA programs are improved.

DETAILED DESCRIPTION

The technical solution in the embodiments of the present disclosure is further described more clearly and completely with the drawings in the embodiments of the present disclosure. Apparently, embodiments described are just a few of all embodiments of the present disclosure. On the basis of embodiments of the disclosure, all other related embodiments made by common technicians of the field without creative work belong to the scope of the disclosure.

Embodiment 1

Figure 1:
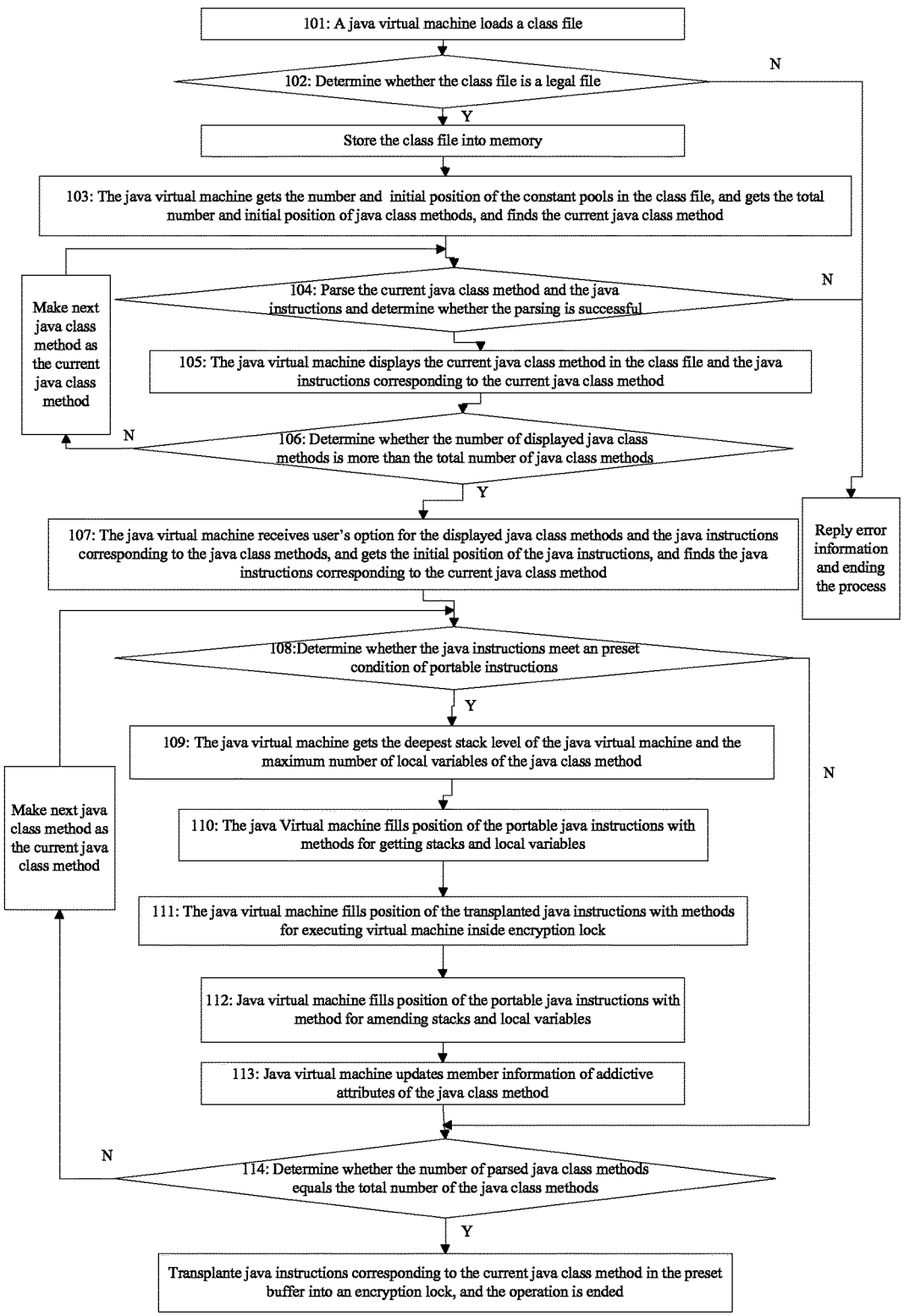
FIG. 1 shows a flow diagram of a method for protecting a JAVA program according to embodiment 1 of the disclosure.

Embodiment 1 of the present disclosure provides a method for protecting a JAVA program as showing in FIG. 1, including steps 101 to 114.

In step 101, a JAVA virtual machine loads a class file.

In step 102, the JAVA virtual machine determines whether the class file loaded is a legal file; stores the class file into a memory and executes step 103 if the class file loaded is a legal file; replies error information and operation is ended if the class file loaded is not the illegal file.

In the embodiment, a file header of the class file is a classfile structure.

the classfile structure is:

```
Classfile{
    u4  magic;
    u2  magic_version;
    u2  magic_version;
```

-continued

```
    u2  constant_pool_count;
    cp_infoconstant_pool[constant_pool_cpunt−1];
    u2  access_flags;
    u2  super_class;
    u2  interfaces_count;
    u2  fields_count;
    field_info  fields[fields_count];
    u2  methods_count;
    method_info  methods[methods_count];
    u2  attributes_count;
    attribute_info  attributes[attributes_count];
}
```

Optionally, whether the member variable magic in the classfile struct is 0xCAFEBABE is determined, the class file is the legal file if the member variable magic in the classfile structure is 0xCAFEBABE; the class file is an illegal file if the member variable magic in the classfile structure is not 0xCAFEBABE.

In step 103, the JAVA virtual machine obtains the number of constant pools and an initial position of the constant pools in the class file, and obtains the total number of JAVA class methods and the initial position of JAVA class methods, and finds a current JAVA class method in accordance with the initial position.

A constant pool contains a name of a JAVA class method and a descriptor of the JAVA class method.

Optionally, a obtained value of a member variable constant_pool_count in the Classfile structure is the number of the constant pools in the class file, and the initial position of the constant pools can be gotten according to a member variable Cp_infoconstant_pool[constant_pool_cpunt-1] in the Classfile struct.

A value of a member variable methods count in the Classfile struct obtained is the total number of the JAVA class methods; and an initial position of the JAVA class method may be gotten according to the member variable Method_infomethods[methods_count] in the Classfile struct.

The current JAVA class method is:

```
public class CRC32 {
    public static int getCRC32(String _source){
        intcrc = 0xFFFFFFFF;
        int poly = 0xEDB88320;
        byte[ ] bytes = _source.getBytes( );
        for (byte b : bytes) {
            int temp = (crc ^ b) & 0xff;
            for (inti = 0; i< 8; i++)
            { if ((temp & 1) == 1)
                    temp = (temp >>> 1) ^ poly;
                else
                    temp = (temp >>> 1);
                }
                crc = (crc>>> 8 ^ temp);
        }
        crc = crc ^ 0xffffffff;
        returncrc;
    }
}
```

In step 104, the JAVA virtual machine parses the current JAVA class method and a JAVA instruction corresponding to the current JAVA class method in accordance with the obtained constant pool and JAVA class method, and determines whether the current JAVA class method and the JAVA instruction are successfully parsed, executes step 105 if the current JAVA class method and the JAVA instruction are successfully parsed; replies error information and the program ends if the current JAVA class method and the JAVA instruction are not successfully parsed.

The process of parsing the current JAVA class method includes step 104-1 to step 104-2.

In step 104-1, the JAVA virtual machine obtains a name of a JAVA class method and a descriptor of the JAVA class method from the constant pools in accordance with a first member variable and a second member variable of the current JAVA class method, and determines whether the name and the descriptor of the JAVA class method is successfully obtained, executes step 104-2 if the name and the descriptor of the JAVA class method are successfully obtained; replies error information and the program ends if the name and the descriptor of the JAVA class method are not successfully obtained.

The structure of the method is:

```
Method_info{
    u2   access_flags;
    u2   name_index;
    u2   descriptor_index;
    u2   attributes_count;
    Attribute_info   attributes[attributes_count];
}
```

The first member variable is name_index which is an index of a name of a JAVA class method in the constant pools, the second member variable is u2 descriptor_index which is an index of a descriptor of the JAVA class method in the constant pools.

In step 104-2, the JAVA virtual machine obtains an additive attribute in accordance with a third member variable and a fourth member variable of the current JAVA class method, and determines whether the additive attribute is successfully obtained, executes step 105 if the additive attribute is successfully obtained; replies error information and the program ends if the additive attribute is successfully obtained.

The third member variable is attributes_count which is a number of additive attributes, the fourth member variable is attribute_info attributes [attributes count], which indicates an initial position of the additive attributes.

In the embodiment, the additive attributes include a code attribute and an Exceptions attribute, where, the code attribute is used for interpreting a value of a JAVA instruction, and the Exceptions attribute is used for pointing out possibly thrown exceptions, which need to be checked, of the JAVA class method.

The process of parsing the JAVA instruction corresponding to the current JAVA class method includes: obtaining a total length of the JAVA instruction corresponding to the current JAVA class method and an offset of the JAVA instruction corresponding to the current JAVA class method in a code attribute structure.

The code attribute structure is:

```
code_attribute {
    u2 attribute_name_index;
    u4 attribute_length;
    u2 max_stack;
    u2 max_locals;
    u4 code_length;
    u1 code[code_length];
    u2 exception_table_length;
    { u2 start_pc;
      u2 end_pc;
      u2 handler_pc;
      u2 catch_type;
    } exception_table[exception_table_length];
    u2 attributes_count;
    attribute_info attributes[attributes_count];}
```

A value of the member variable code_length of the code attribute structure obtained is the length of the JAVA instruction corresponding to the current JAVA class method. The initial position of the JAVA instruction corresponding to the current JAVA class method in accordance with the member variable code[code_length] of the code attribute structure is obtained, and traversing the JAVA instruction corresponding to the current JAVA class methods in turn.

In step 105, the JAVA virtual machine displays the current JAVA class method in the class file and the JAVA instruction corresponding to the current JAVA class method.

In step 106, the JAVA virtual machine determines whether the number of displayed JAVA class methods is more than the total number of JAVA class methods, executes step 107 if the number of displayed JAVA class methods is more than the total number of JAVA class methods; makes next JAVA class method as the current JAVA class method and returns to execute step 104 if the number of displayed JAVA class methods is not more than the total number of JAVA class methods.

In step 107, the JAVA virtual machine receives a choice of a user for the displayed JAVA class method and the JAVA instruction corresponding to the JAVA class method, and according to the additive attribute, obtains the initial position of the JAVA instructions corresponding to the JAVA class method, and finds the JAVA instruction corresponding to the current JAVA class method in accordance with the initial position.

The initial position of the JAVA instruction corresponding to the current JAVA class method is obtained in accordance with the member variable code[code_length] in the additive attribute, and the JAVA instruction corresponding to the current JAVA class method is found according to the initial position.

In the embodiment, the JAVA instruction corresponding to the current JAVA class methods are:

```
0:    iconst_m1
1:    istore_1
2:    ldc    -306674912
4:    istore_2
5:    aload_0
6:    invokevirtual   java.lang.String.getBytes ( )[B
9:    astore_3
10:   aload_3
11:   astore         %4
13:   aload          %4
15:   arraylength
16:   istore         %5
18:   iconst_0
19:   istore         %6
21:   iload          %6
23:   iload          %5
25:   if_icmpge              #100
28:   aload          %4
30:   iload          %6
32:   baload
33:   istore         %7
35:   iload_1
36:   iload          %7
38:   ixor
39:   sipush         255
42:   iand
43:   istore         %8
45:   iconst_0
```

-continued

```
46:    istore      %9
48:    iload       %9
50:    bipush      8
52:    if_icmpge          #86
55:    iload       %8
57:    iconst_1
58:    iand
59:    iconst_1
60:    if_icmpne          #74
63:    iload       %8
65:    iconst_1
66:    iushr
67:    iload_2
68:    ixor
69:    istore      %8
71:    goto        #80
74:    iload       %8
76:    iconst_1
77:    iushr
78:    istore      %8
80:    iinc        %9     1
83:    goto        #48
86:    iload_1
87:    bipush      8
89:    iushr
90:    iload       %8
92:    ixor
93:    istore_1
94:    iinc        %6     1
97:    goto        #21
100:   iload_1
101:   iconst_m1
102:   ixor
103:   istore_1
104:   iload_1
105:   ireturn
```

In step 108, the JAVA virtual machine determines whether the JAVA instruction corresponding to the current JAVA class method meets a preset condition of a portable instruction, executes step 109 if the JAVA instruction corresponding to the current JAVA class method meets the preset condition of the portable instruction; executes step 114 if the JAVA instruction corresponding to the current JAVA class method does not meet the preset condition of the portable instruction.

Figure 2:
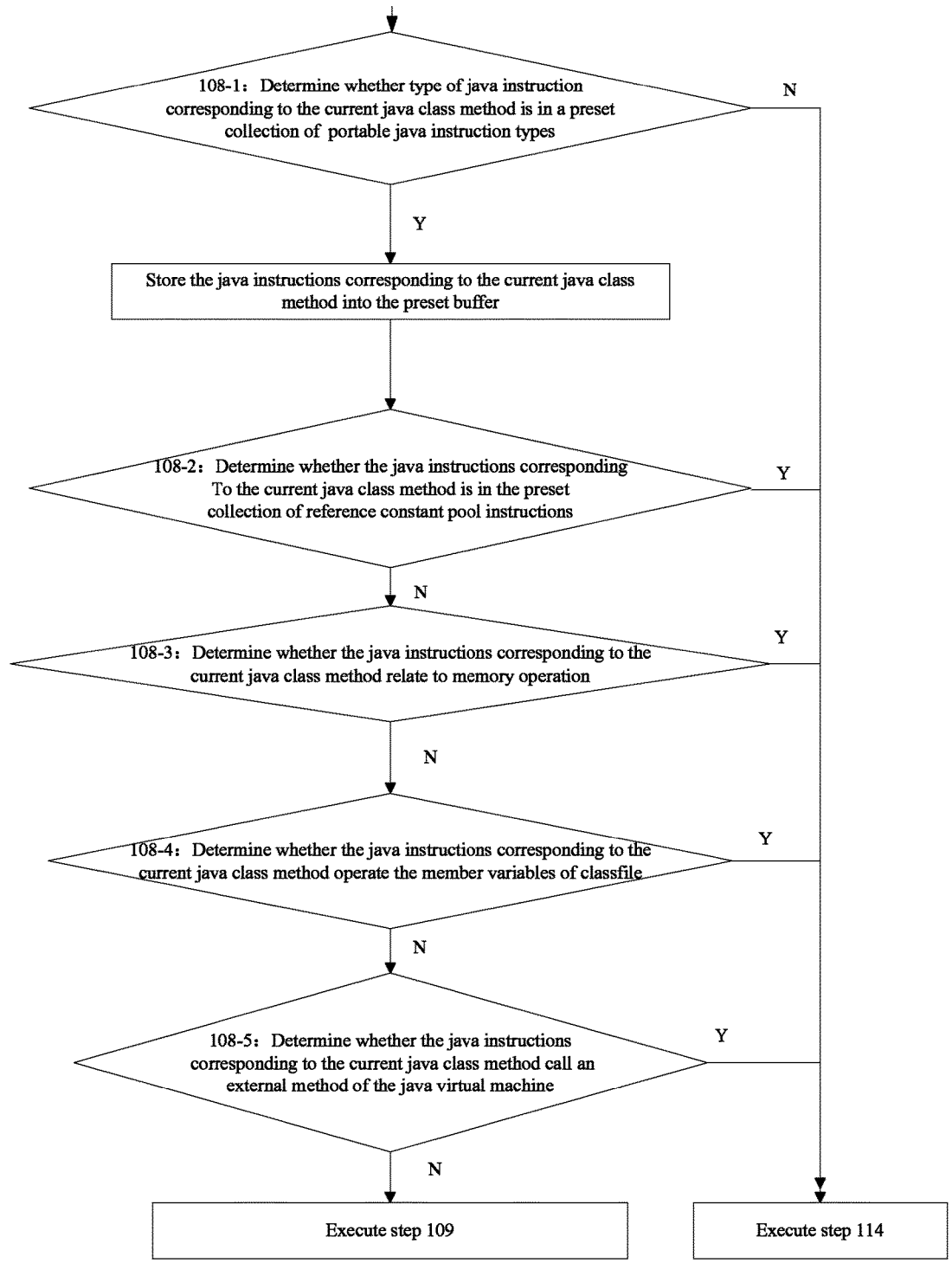
FIG. 2 shows a detail drawing of step 108 of embodiment 1.

As shown in FIG. 2, the process of determining whether the JAVA instruction corresponding to the current JAVA class method meets the preset condition of the portable instructions includes step 108-1 to step 108-5.

In step 108-1, determining whether a type of the JAVA instruction corresponding to the current JAVA class method is in a preset collection of types of the portable JAVA instruction, storing the JAVA instruction corresponding to the current JAVA class method into the preset buffer and executing step 108-2 if the type of the JAVA instruction corresponding to the current JAVA class method is in the preset collection of types of the portable JAVA instruction; executing step 114 if the type of the JAVA instruction corresponding to the current JAVA class method is not in the preset collection of types of the portable JAVA instruction.

The preset collection of types of the portable JAVA instruction contains a stack operation instruction type, a logical operation instruction type, a bitwise operation instruction type, and an arithmetic operation instruction type.

Optionally, the first bit of the current JAVA instruction being 0x01 indicates that the type of the JAVA instruction is the stack operation instruction type; the first bit of the current JAVA instruction being 0x7e indicates that the type of the JAVA instruction is the logical operation instruction type; the first bit of the current JAVA instruction being 0x7a indicates that the type of the JAVA instruction is the bitwise operation instruction type; the first bit of the current JAVA instruction being 0x6c indicates that the type of the JAVA instruction is the arithmetic operation instruction type.

In step 108-2, determining whether the JAVA instruction corresponding to the current JAVA class method is in an preset instruction collection of a reference constant pool, executing step 114 if the JAVA instruction corresponding to the current JAVA class method is in the preset instruction collection of the reference constant pool, which indicates that the JAVA instructions corresponding to the current JAVA class method cannot be transplanted; executing step 108-3 if the JAVA instruction corresponding to the current JAVA class method is not in the preset instruction collection of the reference constant pool.

For instance, in case that the JAVA instruction corresponding to the current JAVA class method is ldc instruction which is used for extracting data from the constant pool and putting the data into a stack, the JAVA instruction is in the preset instruction collection of the reference constant pool and it cannot be transplanted.

In step 108-3, determining whether the JAVA instruction corresponding to the current JAVA class method relates to a memory operation, executing step 114 if the JAVA instruction corresponding to the current JAVA class method relates to the memory operation; executing step 108-4 if the JAVA instruction corresponding to the current JAVA class method does not relate to the memory operation.

For instance, in case that the JAVA instruction corresponding to the current JAVA class method is a "new" instruction used for creating an object, the "new" instruction relates to the memory operation, thus the "new" instruction cannot be transplanted.

In step 108-4, determining whether the JAVA instruction corresponding to the current JAVA class method operates a member variable of classfile, executing step 114 if the JAVA instruction corresponding to the current JAVA class method operates the member variable of classfile; executing step 108-5 if the JAVA instruction corresponding to the current JAVA class method does not operate the member variable of classfile.

For instance, in case that the JAVA instruction corresponding to the current JAVA class method is getfield instruction used for obtaining a member variable in the classfile. The getfield instruction relates to operating member variables, thus the getfield instruction cannot be transplanted.

In step 108-5, determining whether the JAVA instruction corresponding to the current JAVA class method that invokes an external method of the JAVA virtual machine, executing step 114 if the JAVA instruction corresponding to the current JAVA class method invokes the external method of the JAVA virtual machine; executing step 109 if the JAVA instruction corresponding to the current JAVA class method does not invoke the external JAVA class method.

For instance, in case that the JAVA instruction corresponding to the current JAVA class method is invokevirtual instruction used for invoking instance method, the invokevirtual instruction may invoke an external method, thus the invokevirtual instruction cannot be transplanted.

The steps from step 105 to step 108 can also be step A-1 to step D-1 as follows.

In step A-1, the JAVA virtual machine determines whether the JAVA instruction corresponding to the current JAVA class method meets a preset condition of a portable instruction, executes step B-1 if the JAVA instruction corresponding to the current JAVA class method meets the preset condition of the portable instruction; executes step 114 if the JAVA instruction corresponding to the current JAVA class method does not meet the preset condition of the portable instruction.

In step B-1, the JAVA virtual machine displays the current JAVA class method of the JAVA file and the JAVA instruction corresponding to the current JAVA class method.

In step C-1, the JAVA virtual machine determines the number of JAVA class methods which have been parsed is more than a total number of JAVA class methods, executes step D-1 if the number of the JAVA class methods which have been parsed is more than the total number of the JAVA class methods; makes a next JAVA class method as the current JAVA class method and returns to execute step 104 if the number of the JAVA class methods which have been parsed is not more than the total number of the JAVA class methods.

In step D-1, the JAVA virtual machine receives a choice of a user for displayed JAVA class methods and JAVA instructions corresponding to the JAVA class methods, and according to the additive attribute, obtains an initial position of a JAVA instruction corresponding to a chosen JAVA class method, and finds the JAVA instruction corresponding to a current JAVA class method in accordance with the initial position, transplants and stores the JAVA instruction corresponding to the current JAVA class method into the preset buffer, and executes step 109.

The steps from step 105 to step 108 can also be steps A-2 to B-2 as follows.

In step A-2, the JAVA virtual machine determines whether the JAVA instruction corresponding to the current JAVA class method meets a preset condition of a portable instruction, executes step B-2 if the JAVA instruction corresponding to the current JAVA class method meets the preset condition of the portable instruction; executes step 114 if the JAVA instruction corresponding to the current JAVA class method does not meet the preset condition of the portable instruction.

In step B-2, the JAVA virtual machine transplants and stores the JAVA instruction corresponding to the current JAVA class method into the preset buffer and executes step 109.

In step 109, the JAVA virtual machine obtains the deepest stack level of the JAVA virtual machine and the maximum number of local variables of a JAVA class method.

The JAVA virtual machine obtains the deepest stack level of the JAVA class method in accordance with the member max_stack in the code attribute structure, and obtains the maximum number of the local variables of the JAVA class method in accordance with the member max_locals in the code attribute structure.

In step 110, the JAVA virtual machine fills a position of the transplanted JAVA instruction in the class file with a JAVA class method for obtaining stacks and local variables. Step 110 includes step 110-1 to 110-3.

In step 110-1, the JAVA virtual machine locates a position of the transplanted current JAVA class method.

In step 110-2, the JAVA virtual machine creates an index of a constant pool of the current JAVA class method.

Optionally, the index of the constant pool, which points to stored data structure CONSTANT_Methodref_info, is used for describing the current JAVA class method. The index of constant pool occupies two bytes, for instance, in case that the constant pool index is 0001, the index points to the JAVA class method javaanalyzer.R7JavaRuntime.GetLocalData (B)[B in the constant pools.

The data structure CONSTANT_Methodref_info is:

```
CONSTANT_InterfaceMethodref_info {
    u1 tag;
    u2 class_index;
    u2 name_and_type_index; }.
```

Where class_index indicates class r7javaanalyzer.R7JavaRuntime, name_and_type_index indicates method descriptor GetStackData(B)[B.

In the case where the index of the constant pool is 0002, the index points to the JAVA class method r7javaanalyzer.R7JavaRuntime.GetStackData(B)[B in the constant pools.

In step 110-3, the JAVA virtual machine fills the position of the transplanted current JAVA class method with the index of the constant pool and the JAVA class method for obtaining stacks and local variables.

The JAVA class method for obtaining stacks and local variables is an invokestatic method, and the value of the method is 0xb8 which may need an operator of two bytes, and the operator is an index of the constant pool.

In the embodiment, in a case that a content which is inserted into the position of the transplanted JAVA instruction is Invokestatic r7javaanalyzer.R7JavaRuntime.GetLocalData (B)[B, a corresponding value of which is 0xb8 00 01; and in the case that a content which is inserted into the position of the transplanted JAVA instruction is invokestaticr7javaanalyzer.R7JavaRuntime.GetStackData (B)[B, a corresponding value of which is 0xb8 00 02.

In step 111, the JAVA virtual machine fills the position of the transplanted JAVA instruction in the class with a JAVA class method for executing the virtual machine in an encryption lock. The step 111 includes step 111-1 to step 111-3.

In step 111-1, the JAVA virtual machine locates a position of the transplanted current JAVA class method.

In step 111-2, the JAVA virtual machine creates an index of a constant pool of the current JAVA class method.

Optionally, an index of the constant pool occupies two bytes, for instance, in case that an index of a constant pool is 0003, a method pointed at by the index in the constant pools is r7javaanalyzer.R7JavaRuntime.R7Java_RunJava (SS)V.

In step 111-3, the JAVA virtual machine fills the position of the transplanted current JAVA class method with the index of the constant pool and the JAVA class method for executing the virtual machine in the encryption lock.

The JAVA instruction for executing the virtual machine in the encryption lock is an invokevirtual instruction, and the value of the instruction is 0xC7 which may need an operator of two bytes, and the operator is an index of the constant pool.

In the embodiment, a content inserted into the position of the transplanted JAVA instruction is invokevirtualr7javaanalyzer.R7JavaRuntime.R7Java_RunJava(SS)V, and a corresponding value of which is 0xb80001.

In step 112, the JAVA virtual machine fills the position of transplanted JAVA instructions in the class file with a JAVA class method for modifying stacks and local variables. The step 112 includes step 112-1 to 112-3.

In step 112-1, the JAVA virtual machine locates a position of the transplanted current JAVA class method.

In step 112-2, the JAVA virtual machine creates an index of a constant pool of the current JAVA class method.

Optionally, the index of the constant pool occupies two bytes, for instance, if the index of the constant pool is 0005, the method pointed at by the index in the constant pool is r7javaanalyzer.R7JavaRuntime.SetLocalData (B)[B.

If the index of the constant pool is 0006, the method pointed at by the index in the constant pools is invokestaticr7javaanalyzer.R7JavaRuntime.SetStackData (B)[B.

In step 112-3, the JAVA virtual machine fills the position of the transplanted current JAVA class method with the index of the constant pool and the JAVA class method which modifies stacks and local variables.

The instruction for modifying stacks and local variables is an invokestatic instruction, the value of the instruction is 0xD8, and the instruction may need an operator of two bytes which is the index of the constant pool.

In the embodiment, in case that the content inserted into the position of the transplanted JAVA instruction is invokestaticr7javaanalyzer,R7JavaRuntime.SetLocalData (B)[B, a corresponding value of which is 0xD8 00 05; and in case that the content inserted into the position of the transplanted JAVA instruction is invokestatic r7javaanalyzer.R7JavaRuntime.SetStackData(B)[B, a corresponding value of which is 0xD8 00 06.

In step 113, the JAVA virtual machine updates member information of the additive attribute of the JAVA class method.

For instance, because the contents of filled JAVA instructions increase, the length of the code attribute of the additive attributes needs to be modified.

In step 114, the JAVA virtual machine determines whether the number of JAVA class methods which have been parsed equals to a total number of the JAVA class methods in the class file, transplants the JAVA instruction corresponding to the current JAVA class method in the preset buffer into the encryption lock and finishes the process of transplanting if the number of the JAVA class methods which have been parsed equals to the total number of the JAVA class methods in the class file; makes a next JAVA class method as the current JAVA class method and returns to execute step 108 if the number of the JAVA class methods which have been parsed does not equal to the total number of the JAVA class methods in the class file.

In the embodiment, the filled JAVA class method is:

| | |
|---|---|
| invokestatic | r7javaanalyzer.R7JavaRuntime.GetLocalData (B)[B |
| invokestatic | r7javaanalyzer.R7JavaRuntime.GetStackData (B)[B |
| sipush | 1   dirID |
| sipush | 1   filedID |
| invokevirtual | r7javaanalyzer.R7JavaRuntime.R7Java_RunJava (SS)V |
| invokestatic | r7javaanalyzer.R7JavaRuntime.SetLocalData (B)[B |
| invokestatic | r7javaanalyzer.R7JavaRuntime.SetStackData (B)[B. |

While all above are preferred embodiments of the present disclosure, scope of the disclosure is not limited to hereof, variations and changes which can be made by those skilled in the art easily belong to scope of the disclosure. It is intended that the claims defined the scope of the disclosure and that method and structures within the scope of these claims and their equivalents be covered thereby.

The invention claimed is:

1. A method for protecting a JAVA program, comprising:
    step A, comprising: loading, by a JAVA virtual machine, a class file, and determining whether the class file is a legal file, executing step B if the class file is the legal file; replying error information and ending the method if the class file is not the legal file;
    step B, comprising: obtaining, by the JAVA virtual machine, a total number of JAVA class methods and an initial position of the JAVA class methods in the class file, and finding a current JAVA class method in accordance with the initial position;
    step C, comprising: parsing, by the JAVA virtual machine, a JAVA instruction corresponding to the current JAVA class method, and determining whether the JAVA instruction is successfully parsed; executing step D if the JAVA instruction is successfully parsed; replying error information and ending the method if the JAVA instruction is not successfully parsed;
    step D, comprising: determining, by the JAVA virtual machine, whether the JAVA instruction corresponding to the current JAVA class method qualifies as a portable instruction, transplanting and storing the JAVA instruction corresponding to the current JAVA class method into a preset buffer and executing step E if the JAVA instruction qualifies as a portable instruction; executing step G if the JAVA instruction does not qualify as a portable instruction;
    step E, comprising: obtaining, by the JAVA virtual machine, the deepest stack level of the JAVA virtual machine and the maximum number of local variables of the current JAVA class method;
    step F, comprising: in accordance with the deepest stack level of the JAVA virtual machine and the maximum number of the local variables, filling, by the JAVA virtual machine, a position of the transplanted JAVA instruction in the class file with a JAVA class method for obtaining a stack and a local variable, a JAVA class method for executing a virtual machine in an encryption lock and a JAVA class method for modifying a stack and a local variable, and executing step G; and
    step G, comprising: determining, by the JAVA virtual machine, whether the number of JAVA class methods which have been parsed reaches a total number of the JAVA class methods in the class file, transplanting a JAVA instruction corresponding to a current JAVA class method in the preset buffer into an encryption lock and ending the method if the number of the JAVA class methods which have been parsed reaches the total number of the JAVA class methods in the class file; continuing to obtain a next JAVA class method and making the next JAVA class method as the current JAVA class method, and returning to execute step C if the number of the JAVA class methods which have been parsed does not reach the total number of the JAVA class methods in the class file.

2. The method of claim 1, wherein in step A, the step of determining whether the class file is a legal file comprises: obtaining the class file and determining whether a file header of the class file is a preset string, the class file is the legal file if the file header of the class file is the preset string; the class file is an illegal file if the file header of the class file is not the preset string.

3. The method of claim 1, wherein in step C, the step of parsing a JAVA instruction corresponding to the current JAVA class method comprises:
    step C-1, comprising: obtaining, by the JAVA virtual machine, the number of constant pools and an initial position of the constant pools in the class file;
    step C-2, comprising: obtaining, by the JAVA virtual machine, in accordance with a first member variable and a second member variable of the current JAVA class method, a name of a JAVA class method and a descriptor of the JAVA class method from the constant pools, and determining whether the name of the JAVA class method and the descriptor of the JAVA class method are successfully obtained, executing step C-3 if the name of the JAVA class method and the descriptor of the JAVA class method are successfully obtained; replying error information and ending the method if the name of the JAVA class method and the descriptor of the JAVA class method are not successfully obtained; and step C-3, comprising: obtaining, by the JAVA virtual machine, in accordance with a third member variable and a fourth member variable of the current JAVA class method, an additive attribute of the current JAVA class method, and determining whether the additive attribute is successfully obtained, executing step D if the additive attribute is successfully obtained; replying error information and ending the method if that the additive attribute is not successfully obtained.

4. The method of claim 3, wherein, the first member variable of the current JAVA class method is an index of a name of a JAVA class method in the constant pools; the second member variable of the current JAVA class method is an index of a descriptor of the JAVA class method in the constant pools; the third member variable of the current JAVA class method is the number of additive attributes of the current JAVA class method; the fourth member variable of the current JAVA class method is an initial position of the additive attributes of the current JAVA class method.

5. The method of claim 3, wherein the additive attributes comprise a code attribute, the code attribute comprises a JAVA instruction of the current JAVA class method and a length of the JAVA instruction of the current JAVA class method.

6. The method of claim 3, wherein between step C and step D, the method comprises:
   step A-1, comprising: displaying, by the JAVA virtual machine, the current JAVA class method of the class file and the JAVA instruction corresponding to the current JAVA class method;
   step B-1, comprising: determining, by the JAVA virtual machine, whether the number of JAVA class methods which have been parsed is more than a total number of the JAVA class methods in the class file, executing step C-1 if the number of JAVA class methods which have been parsed is more than the total number of the JAVA class methods in the class file; making a next JAVA class method as the current JAVA class method and returning to execute step C if the number of JAVA class methods which have been parsed is not more than the total number of the JAVA class methods in the class file; and
   step C-1, comprising: receiving, by the JAVA virtual machine, a choice of a user for the displayed JAVA class method and the JAVA instruction corresponding to the JAVA class method, and obtaining the initial position of the JAVA instruction corresponding to the JAVA class method which has been chosen by the user according to the additive attribute, and finding the JAVA instruction corresponding to the current JAVA class method according to the initial position, and executing step D.

7. The method of claim 3, wherein, step D comprises:
   step A-2, comprising: determining, by the JAVA virtual machine, whether the JAVA instruction corresponding to the current JAVA class method qualifies as a portable instruction, executing step B-2 if the JAVA instruction corresponding to the current JAVA class method qualifies as a portable instruction; executing step G if the JAVA instruction corresponding to the current JAVA class method does not qualify as a portable instruction;
   step B-2, comprising: displaying, by the JAVA virtual machine, the current JAVA class method of the JAVA file and the JAVA instruction corresponding to the current JAVA class method;
   step C-2, comprising: determining, by the JAVA virtual machine, whether the number of JAVA class methods which have been parsed is more than a total number of the JAVA class methods in class files, executing step D-2 if the number of the JAVA class methods which have been parsed is more than the total number of the JAVA class methods in class files; making a next JAVA class method as the current JAVA class method and returning to execute step C if the number of the JAVA class methods which have been parsed is not more than the total number of the JAVA class methods in class files; and
   step D-2, comprising: receiving, by the JAVA virtual machine, a choice of a user for the displayed JAVA class method and JAVA instruction corresponding to the JAVA class method, and according to the additive attribute, obtaining an initial position of a JAVA instruction which has been chosen, and making a JAVA instruction in the initial position as a current JAVA instruction, and transplanting and storing the current JAVA instruction into a preset buffer, and executing step E.

8. The method of claim 1, wherein the step of determining whether the JAVA instruction corresponding to the current JAVA class method qualifies as a portable instruction comprises:
   step D-1, comprising: determining, by the JAVA virtual machine, whether a type of the JAVA instruction corresponding to the current JAVA class method is in a preset collection of types of a portable JAVA instruction, executing step D-2 if the type of the JAVA instruction corresponding to the current JAVA class method is in the preset collection of the type of a portable JAVA instruction; executing step G if the type of the JAVA instruction corresponding to the current JAVA class method is not in the preset collection of the type of a portable JAVA instruction, which indicates that the current instruction cannot be transplanted;
   step D-2, comprising: determining, by the JAVA virtual machine, whether the JAVA instruction corresponding to the current JAVA class method is in a preset instruction collection of a reference constant pool, executing step G if the JAVA instruction corresponding to the current JAVA class method is in the preset instruction collection of the reference constant pool, which indicates that the current instruction cannot be transplanted; executing step D-3 if the JAVA instruction corresponding to the current JAVA class method is not in the preset instruction collection of the reference constant pool;
   step D-3, comprising: determining, by the JAVA virtual machine, whether the JAVA instruction corresponding to the current JAVA class method relates to a memory operation, executing step G if the JAVA instruction corresponding to the current JAVA class method relates to the memory operation, which indicates that the current instruction cannot be transplanted; executing step D-4 if the JAVA instruction corresponding to the current JAVA class method does not relate to the memory operation;

step D-4, comprising: determining, by the JAVA virtual machine, whether the JAVA instruction corresponding to the current JAVA class method operates a member variable of the class file structure, executing step G if the JAVA instruction corresponding to the current JAVA class method operates the member variable of the class file structure, which indicates that the current instruction cannot be transplanted; executing step D-5 if the JAVA instruction corresponding to the current JAVA class method does not operate the member variable of the class file structure; and step D-5, comprising: determining, by the JAVA virtual machine, whether the JAVA instruction corresponding to the current JAVA class method invokes an external JAVA class method, executing step G if the JAVA instruction corresponding to the current JAVA class method invokes the external JAVA class method, which indicates that the current instruction cannot be transplanted; executing step E if the JAVA instruction corresponding to the current JAVA class method does not invoke the external JAVA class method.

9. The method of claim 8, wherein, the preset collection of types of the portable JAVA instruction comprises a stack operation instruction type, a logical operation instruction type, a bitwise operation instruction type, and an arithmetic operation instruction type.

10. The method of claim 1, wherein, in step F, filling the position of the transplanted JAVA instruction in the class file with the JAVA class method for obtaining the stack and the local variable comprises:

step F-11, comprising: locating, by the JAVA virtual machine, a position of a transplanted current JAVA class method;

step F-12, comprising: creating, by the JAVA virtual machine, an index of a constant pool of the current JAVA class method; and step F-13, comprising: filling, by the JAVA virtual machine, the position of the transplanted current JAVA class method with the index of the constant pool and the JAVA class method for obtaining stacks and local variables.

11. The method of claim 1, wherein, in step F, filling, by the JAVA virtual machine, the position of the transplanted JAVA instruction in the class file with the JAVA class method for executing the virtual machine in the encryption lock comprises:

step F-21, comprising: locating, by the JAVA virtual machine, a position of a transplanted current JAVA class method;

step F-22, comprising: creating, by the JAVA virtual machine, a constant pool index of the current JAVA class method; and step F-23, comprising: filling, by the JAVA virtual machine, the position of the transplanted current JAVA class method with the index of the constant pool and the JAVA class method for executing the virtual machine in the encryption lock.

12. The method of claim 1, wherein, in step F, filling the position of the transplanted JAVA instruction in the class file with the JAVA class method for modifying stacks and local variables comprises:

step F-31, comprising: locating, by the JAVA virtual machine, a position of a transplanted current JAVA class method;

step F-32, comprising: creating, by the JAVA virtual machine, a constant pool index of the current JAVA class method; and step F-33, comprising: filling, by the JAVA virtual machine, the position of the transplanted current JAVA class method in the class file with the index of the constant pool and the JAVA class method for modifying the stacks and the local variables.

* * * * *